(No Model.) 2 Sheets—Sheet 2.
H. A. WEBER & J. G. ZEIDLER.
MACHINE FOR MIXING FLOUR.
No. 384,656. Patented June 19, 1888.
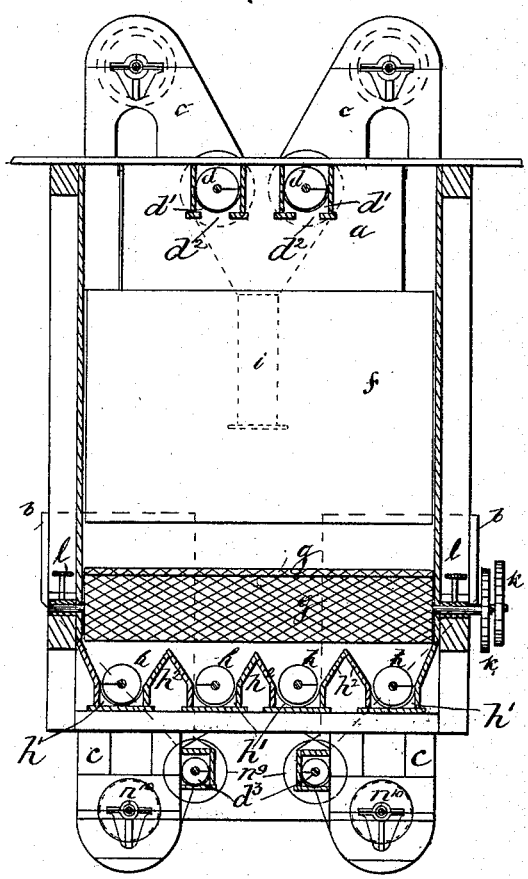
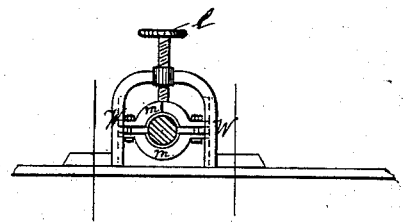

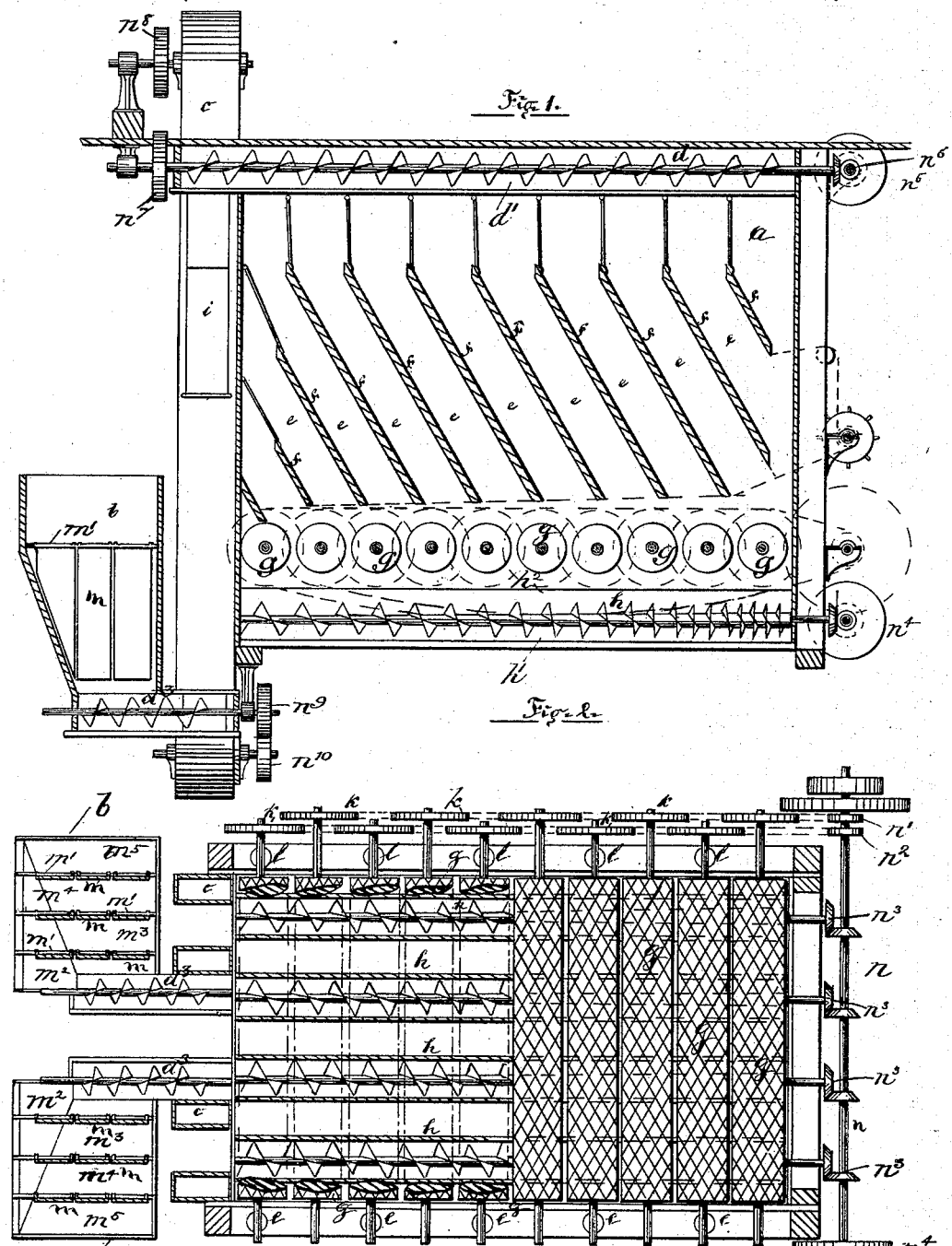

UNITED STATES PATENT OFFICE.

HERMANN AUGUST WEBER AND JOHANN GOTTLIEB ZEIDLER, OF GÖRLITZ, GERMANY.

MACHINE FOR MIXING FLOUR.

SPECIFICATION forming part of Letters Patent No. 384,656, dated June 19, 1888.

Application filed November 6, 1886. Serial No. 218,146. (No model.)

*To all whom it may concern:*

Be it known that we, HERMANN AUGUST WEBER and JOHANN GOTTLIEB ZEIDLER, subjects of the Emperor of Germany, and residing at Görlitz, Germany, have invented a new and useful Improvement in Machines for Mixing Flour, of which the following is a specification.

This invention relates to machinery for mixing flour; and it consists in certain improvements in such machinery as are hereinafter described, and more particularly pointed out in the claims.

The object of the improvements is a machine capable of mixing different sorts of flour introduced into the machine at different times. Since, however, in mills generally such various sorts of flour are not ground or made simultaneously, but at different times, it is necessary with the mixing-machines heretofore in use to complete the grinding of all the flour to be mixed before commencing the mixing thereof. With the improved machine hereinafter described each product of flour as it is formed may be fed direct from the mill into the mixer and there mixed efficiently and with the flour already in the mixer, if there be any therein, as also with that thereafter to come as the latter arrives in the mixer.

A secondary object of the invention is to enable bulk flour or flour in quantities to be placed in the hopper of the machine (as, for instance, when the latter is not fed direct by the stream of flour issuing from the mill or the like) without the latter being clogged thereby.

Referring to the two sheets of explanatory drawings hereunto annexed, Figure 1 thereof is a vertical longitudinal section of a machine embodying the improvements. Fig. 2 is a horizontal section thereof, the right-hand part of the figure showing the roller-bottom of the mixer, the left-hand part of the figure showing the hoppers and the parts of the machine lying under the roller-bottom. Fig. 3 is a vertical cross-section of the machine; and Fig. 4 is a detail view, being an elevation of one of the bearings of one of the alternate rollers of the roller-bottom.

Like reference-letters indicate like parts throughout the figures.

$a$ is a receptacle, preferably oblong, having a bottom or floor composed of a series of rollers, $g$, journaled horizontally parallel to each other at a slight adjustable distance apart and forming a substantially horizontal floor. The rollers are provided with right and left handed spiral grooving, by which their hold upon the flour, and, consequently, the mixing properties of the roller-bottom, are improved. Furthermore, each alternate roller is carried in vertically-displaceable bearings, such as are shown in Fig. 4, so that by raising alternate rollers the intervals between the rollers may be very exactly and uniformly adjusted. For this purpose the frame of the machine carries the vertical guide-bars $w\, w$, connected above to form a boss for the passage of a screw-spindle, $l$, having a thumb-nut or equivalent device for raising or lowering said spindle by turning it in the boss. To the lower end of the spindle $l$ aforesaid is connected the bearing $w'$ of the trunnion of the roller, said bearing having lugs by which it is guided vertically on the bars $w\, w$.

In the space $a$ above the roller-floor are the partitions $f$, the essential features of which are that they are not vertical, but are more or less inclined, their angle of inclination being preferably adjustable, so that the flour introduced, as hereinafter described, into the spaces $e$ is supported for the greater part by the partitions, so that it does not press upon the roller-bottom $g$, but lies more or less slightly (according to the angle of the partitions) thereon.

The partitions $f$ may be rendered adjustable by pivoting them above or swinging them from the roof of the receptacle and connecting their lower edges by a chain or the like adapted to be wound upon a drum, so as to draw the lower edges of the partitions simultaneously more or less away from their vertical position, as indicated in Fig. 1. We do not, however, attach importance to this method of adjusting the angle of inclination of the partitions, since it is obvious that the same may be performed in a variety of ways without departing from the spirit of our invention.

Under the floor of rollers $g$ are the collecting-spirals $h$, of which there may be any suitable number. Each spiral $h$ lies in a separate trough, $h'$, the spaces between the troughs being covered by sheds $h^2$, adapted to deflect the falling flour into the troughs $h'$. Above the plates $f$, in or near the upper part of the receptacle $a$, are arranged distributing-spirals $d$, preferably two in number, inclosed in troughs $d'$, having perforated bottoms $d^2$. For this purpose the spirals $h$ feed to and the spirals $d$ receive flour from the elevators $c\ c$, fresh flour being also fed in first instance from the hoppers to said elevators. The construction of the elevators is not important. Their connection with the spirals $d$ may also be at any time discontinued, and a hopper or chute, $i$, substituted for causing the flour to leave the machine.

The gear by which the parts may be moved is also shown in the annexed drawings. The rollers $g$ are provided with the tooth-wheels $k$, arranged alternately in two planes, as shown, the said toothed wheels being driven from shaft $n$ by chains gearing over said series of wheels, and over the two spur-wheels $n'\ n^2$ on the shaft $n$. The collecting-spirals $h$ are driven by bevel-gear $n^3$ from said shaft. The pulley $n^4$ on shaft $n$ is geared with pulley $n^5$ on shaft $n^6$ by belt or strap, and the distributing-spirals $d$ are operated by bevel-gear from this shaft. The pulleys $n^7$ on shafts of the spirals $d$ are geared by belts with pulleys $n^8$ on the elevators $c\ c$, and the spirals $d^3$ are operated by pulleys $n^9$, geared to pulleys $n^{10}$ of the elevators. The pulleys $d^3$ serve to guide or feed the flour from the hoppers $b$ to the elevators $c$.

In the hoppers $b$ are suspended, upon cross-rods $m'$, as shown, a number of light plates, $m$, three (more or less) on each rod, the rods being parallel. By this means the hopper is divided into several compartments, $m^2\ m^3\ m^4\ m^5$, &c., divided by parallel walls. When the spirals $d^3$ are turned, the flour is gradually emptied from the compartment $m^2$ next thereover, the flour falling easily therein, owing to the vertical sides. When the compartment $m^2$ is empty, or nearly so, the weight of the flour in the compartment $m^3$ causes the partition between said compartment and $m^2$ to be deflected outward until this compartment is also emptied. Compartment $m^4$ is then similarly emptied, and lastly $m^5$.

The collecting-spirals $h$ are preferably made with increasing pitch as they approach the elevator end, to enable them to receive the flour from the roller-bottom along their whole length. The diameter of the central spindle of the spirals is also continuously decreased toward the same direction for the same purpose.

The operation of the machine herein described is as follows: Flour being placed in the hoppers $b$ is gradually transferred by the spirals $d^3$ to the elevators and delivered to the spirals $d$. Being pushed forward in the troughs $d'$, it falls through the perforated bottom $d^2$ vertically upon the first plate $f$ and upon the first roller, and is gradually heaped up until the upper edge of the heap arrives level with the bottom of the trough $d'$. The flour is then fed over this edge farther along by the spirals $d$, and the mound of flour gradually forms a bottom for said spirals, and increases until the whole space $a$ is filled, or until the amount of flour to be mixed is all arrived in the receptacle $a$. The roller-bottom $g$ is now set in motion, and the flour is worked thereby through the intervals between the rollers, lumps and clods being broken thereby. The flour falling through is collected and forwarded to the elevators by the spirals $h$, and arrives into the receptacle $a$ by means of the spirals $d$, or into the hopper $i$ if the flour has been sufficiently mixed. It will be understood that while this mixing is being performed other flour may be fed to the hoppers $b$, and will be elevated, together with that which has passed through the roller-bottom, to be simultaneously passed into the receptacle $a$.

Having now described the invention, we claim—

1. In flour-mixing machines, the combination, in a chamber, of a series of inclined plates, $f\ f$, with a series of rollers, $g\ g$, under said plates, the said rollers being journaled in a substantially horizontal plane, and with their axes parallel to the plane of the plates.

2. The combination, in a chamber, of a series of inclined plates, $f\ f$, with a series of rollers forming a floor below said plates, the said rollers being journaled in a substantially horizontal plane with their axes parallel to said plates, together with vertically-adjustable bearings for alternate rollers, for the purpose set forth.

3. The combination, as set forth, of adjustably-inclined plates $f\ f$, a horizontal roller-bottom, $g\ g$, below said plates, the axes of the rollers being parallel to the plane of said plates, spirals $d$ above said plates, and spirals $h$ under said roller-bottom, the feed-direction of said spirals $d\ h$ being in a direction crosswise of the axes of the rollers.

4. The combination, as set forth, of adjustably-inclined plates $f\ f$, a horizontal roller-bottom, $g\ g$, thereunder, the axes of the rollers being parallel to the plane of said plates, means for rendering the axes of alternate rollers vertically adjustable, troughs $d'$, with perforated bottoms $d^2$ above said plates, spirals $d$ in said troughs $d'$, and spirals $h$ under said roller-bottom, the feed-direction of said spirals being crosswise of the axes of said rollers, troughs $h'$ for said spirals $h$, and shed $h^2$, dividing said troughs, the said spirals $h$ having increasing pitch and decreasing conical axles in the direction of their feed.

In testimony whereof we have signed this specification in the presence of two subscribing witnesses.

HERMANN AUGUST WEBER.
JOHANN GOTTLIEB ZEIDLER.

Witnesses:
ARTHUR ALEXANDER KATZ,
PAUL DRUCKMÜLLER.